UNITED STATES PATENT OFFICE 2,584,977

LUBRICATING OIL ADDITIVES

John D. Bartleson, Cleveland, Ohio, assignor to The Standard Oil Company, Cleveland, Ohio, a corporation of Ohio No Drawing. Application July 9, 1946, Serial No. 682,291

4 Claims. (Cl. 252—32.7)

This invention relates to oil-dispersible compositions suitable as antioxidants or as lubricants and lubricant additives comprising reaction products of a phosphorous sulfide with a nitrile, with or without added reactive sulfur. The lubricants comprising such reaction products are suitable for use under various conditions, including high temperatures or high pressures or both, as for instance, use in an internal combustion engine operating at higher temperatures and in which the lubricant is in close contact with metallic surfaces, metal compounds and high temperature gases, and use as gear lubricants when surfaces must be lubricated which are subjected to high pressures.

The objects achieved in accordance with the invention include, among others, the provision of an agent which may be useful itself as a lubricant, and which, when added to lubricants, will markedly inhibit the very objectionable deposition of lacquer, acid and sludge formation, corrosion and other types of deterioration which tend to occur under operating conditions; the provision of lubricating oils containing such an addition agent; and other objects which will be apparent as embodiments are disclosed hereinafter.

In accordance with the invention, it has been found that a phosphorus sulfide may be reacted with a nitrile, such as one containing at least 12 carbon atoms in the molecule at an elevated temperature, and the resulting reaction product will have good solubility in lubricating oils and greases. These reaction products have highly advantageous properties as additives for lubricants. They improve the corrosion, lacquer, sludge, viscosity increase, and the like characteristics of lubricating oils. In addition, if an element of the sulfur family, i. e., sulfur, selenium or tellurium, is reacted with the reaction product, still further improved additives are obtained. Derivatives obtained from these sulfide-nitrile derived products, e. g., metal derivatives, nitrogen base derivatives, ester derivatives, or mixtures, or mixed derivatives thereof also have these desired properties.

The above reaction products may be used as antioxidants or stabilizers for organic materials which are subject to oxidative deterioration, e. g., elastomers, rubber, asphalt, plastic materials, paints, fats and fatty oils, gasoline, and the like.

The sulfide-nitrile reaction temperature conditions vary somewhat with the nitrile used and the reaction time. The temperature should be high enough to give a reaction in a reasonably short time and to give a reaction product which is soluble in lubricating oil. The temperature should not be so high as to decompose the reaction products. In general, the temperature will be in the range of about 250° to 600° F., at atmospheric pressure. Economy of heat suggests that a temperature higher than that necessary to carry out the reaction will be wasteful. An optimum temperature is about 325° to 450° F.

Sulfur or a sulfur element can be incorporated by adding elemental sulfur at any state of the preparation, i. e., by reacting sulfur with the nitrile and then treating with the sulfide, or treating a sulfide-nitrile reaction product with sulfur, or treating a derivative of the sulfide-nitrile reaction product with sulfur, the latter two being preferred.

The reaction time varies somewhat with the nitrile and the temperature and falls within the general range of from 1 minute to about several hours, desirably from about ¼ to ¾ hour and preferably about ½ hour. The reaction usually does not require over two hours. The reaction time is a function of the temperature, the amount of the sulfide that is to react, the subdivision of the sulfide, rate of stirring, etc., and must be selected with reference to these factors so as to give an oil soluble product. The reaction is somewhat exothermic and on a commercial scale the heat evolved thereby may be used to maintain the temperature. The ingredients may be added in increments if this is desirable for temperature control or for other reasons.

The reactions may be carried out in the presence or absence of air, or in an atmosphere of a non-deleterious gas, such as $H_2S$ or nitrogen.

The sulfide-nitrile reaction may be carried out with direct admixture of the reactants, or by their admixture in the presence of a diluent which may or may not be subsequently removed. A volatile inert solvent, such as a saturated hydrocarbon boiling in the desired temperature range, may be used as a diluent which is to be subsequently removed. If a volatile solvent is used, it may be selected so as to have a boiling point that will assist in controlling the temperature if the reaction is carried out under reflux conditions. Alternatively, a heavier oil such as white oil, or a lubricating oil of about the same properties as that to which the new composition is to be added, may be used as a diluent which is not to be removed. In a commercial embodiment of the invention, a diluent probably would not be used unless it is a mineral oil, and a diluent is not necessary.

The pentasulfide is preferred although other phosphorus sulfides or mixtures of sulfides may be employed. Phosphorus pentasulfide is most economic and readily available and for this reason is used in the illustrative examples. Under suitable conditions sulfides of arsenic or antimony may be similarly employed.

The nitrile or mixture of nitriles may be reacted with the phosphorus sulfides in ratios of about 0.1 to 1.0 mol of sulfide per mol of nitrile. Even small amounts show a significant improvement. Generally, about 0.5 to about 1.0 mol of the sulfide is the usual range that will be used.

A large variety of nitriles are suitable, for example, aliphatic, aromatic or heterocyclic nitriles, saturated or unsaturated; and those having at least 12 carbon atoms in a molecule are preferred. The choice may be controlled by the desired lubricant solubility characteristics of the primary sulfide-nitrile reaction product or the final derivative product. The nitrile should not be so highly unsaturated or conjugated as to give reaction products which are not oil dispersible. Poly-nitriles may be used. Typical readily available nitriles are those which correspond to the carboxylic acids having from 12 to about 20 carbon atoms in the molecule obtainable from natural products, such as dodecanoic nitrile, tetradecanoic nitrile, octadecanoic nitrile, eicosanoic nitrile and the corresponding unsaturated nitriles containing one or more olefinic double bonds in the molecule. The nitrile stock may be a mixture of nitriles of different molecular weight or different degrees of unsaturation. It need not be pure provided that the above nitriles form the major or essential components.

The process is preferably conducted so that the yield is very high and appreciable amounts of oil insoluble products are not formed. Generally, the amount of sulfide is chosen so that it will all react at the temperature selected, and the reaction is continued until it is consumed.

To achieve an additional improvement which results if additional reacted sulfur is present in the additive, about 0.01 to 2.0 and preferably 0.1 to 1.0 gram atoms of sulfur is incorporated, per mol of nitrile used. This sulfur can be incorporated by adding elemental sulfur, preferably after the formation and cooling of the high temperature primary reaction product, and maintaining the mass at about 200° to 300° F. for about a few minutes to several hours, and preferably about one hour. Selenium and tellurium function in much the same way as sulfur in this respect, and may be incorporated similarly. Alternatively, the sulfur can be added to the metal, nitrogen base, or ester derivatives.

The sulfide-nitrile reaction products including those containing an added sulfur family element may be utilized in the form of their metal, nitrogen base or ester derivatives. Mixed derivatives or mixtures of the derivatives may be employed. These derivatives are formed from agents capable of replacing an acid hydrogen atom. Although the formation of the above derivatives may not involve replacement of acid hydrogen, the materials used as agents fall into the class of materials capable of replacing or combining with acid hydrogen.

The metal derivatives may be formed from one or more metal compounds, such as their sulfides, oxides, hydroxides, carbides and cyanamides. The preferred metals are group I, group II and group III metals of the periodic table, such as potassium, zinc, barium and aluminum.

When a metal, nitrogen base, or ester derivative containing an added reacted sulfur family element is desired, there are two primary alternative ways of producing it: (1) the sulfide-nitrile reaction product can be reacted with an element of the sulfur family and this reaction product then converted into the derivative, or (2) the primary sulfide-nitrile reaction product can be converted into the derivative and this derivative then reacted with an element of the sulfur family.

In the preparation of the above type metal derivatives, the reaction step of forming the metal derivatives may be carried out at temperatures in the range of about 100° to about 350° F., a temperature in the range of about 180° to 250° F. being preferred. From about 0.25 to about 6.0 equivalents of the metal compound may be used per mol of the sulfide in the sulfide-nitrile reaction product, preferably about 1.0 to about 3.0 equivalents. An equivalent is the quotient of a mol divided by the valence of the metal concerned.

The reaction products obtained by reacting sulfur with the sulfide-nitrile reaction products may be converted to their nitrogen base derivatives by reaction with one or more basic nitrogenous compounds such as ammonia, amines, or heterocyclic nitrogen bases. Generally, ammonia and the gaseous or liquid amines or nitrogenous organic compounds are preferred. Analogous polyamines may be used similarly.

From about 0.25 to about 6.0 equivalents of the nitrogen base may be used per mol of the sulfide in the sulfide-nitrile reaction product, preferably about 1 to about 4 equivalents. An equivalent is the quotient of a mol divided by the valence of the nitrogen base concerned.

The ester derivatives may be prepared by reaction of the sulfide-nitrile reaction products with one or more alcohols, or thio-alcohols, or alkyl, aryl, cycloalkyl, and heterocyclic compounds containing an alcoholic or thio-alcoholic group. The word alcohol is used in its generic sense to include any of the above types of compounds.

The reaction of forming the ester derivatives may be carried out at temperatures in about the range of about 100° to 350° F., a temperature of 180° to 280° F. being preferred. From about 0.2 to about 6.0 equivalents of the esterifying agent may be used per mol of the sulfide in the sulfide-nitrile reaction product, preferably about 1.0 to about 4.0 equivalents. An equivalent is the quotient of a mol divided by the valence (e. g., number of alcoholic groups in the molecule) of the agent used.

It is beneficial to have water present in the reaction step of forming the metal or the nitrogen base derivative, and this may be introduced as water of crystallization, or as a hydrate of the metal compound or of the nitrogen base, or it may be introduced separately.

A plurality of metals, or of nitrogen bases, or of esterifying agents, or mixtures of any two or more thereof, may be used.

If the amount of the metal, nitrogen base or alcohol or combinations thereof, is small, the final product may be a mixture of the initial reaction product and the metal, nitrogen base or ester derivative.

The yield in the above reaction step is very high.

After this reaction step is complete, the reaction mass may be used directly as an additive, or preferably it is processed, e. g., centrifuged or filtered, to remove water and any traces of oil insoluble by-product substances. If an excess of the metal compound is used, the unreacted excess may be separated at this stage. If a solvent is used as a diluent, it may be removed by vacuum distillation at this stage.

The reaction may be carried out in the presence or absence of air or in an atmosphere of a non-deleterious gas, such as nitrogen or $H_2S$.

These new compositions impart many desirable properties to lubricants to which they have been added.

They act as detergents therein, and also as inhibitors of corrosion and lacquer and sludge formation.

The amount of the above-described primary or base derivatives of sulfide-nitrile reaction products to be added to an oil or grease will depend upon the characteristics of the oil or grease and intended use. Some oils have more of a tendency to corrode metals, or to form acids, sludges and lacquer deposits than others, and such oils require larger quantities of the addition agent. Also, oils that are intended for higher temperatures require larger amounts of the additive. In general, for lubricating oils the range is from 0.25% to 10% by weight, but under some circumstances amounts as low as 0.01% show a significant improvement. As to an upper limit, it will be uneconomical to add more than is necessary to impart to the lubricant the desired properties. Generally, not over 50% would be used, although since the new materials are lubricants, even 100% thereof could be used.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

*Example 1*

132 grams of commercial octadecane nitrile (analysis: 94% by weight of octadecanoic nitrile and 6% hexadecanoic nitrile), 111 grams of phosphorus pentasulfide and 396 grams of No. 225 Red Oil (a conventional acid treated Mid-Continent lubricating oil base stock of S. A. E. 20) were mixed and heated at 500° F. in an inert nitrogen atmosphere for 30 minutes, with agitation. The reaction mass was filtered hot. This filtrate product was used as an additive in the test reported hereinafter.

*Example 2*

(a) 132 grams of commercial octadecane nitrile (analysis: 94% by weight of octadecanoic nitrile and 6% hexadecanoic nitrile), 55 grams of phosphorus pentasulfide and 396 grams of No. 225 Red Oil (a conventional acid treated Mid-Continent lubricating oil base stock of S. A. E. 20) were mixed and heated at 400° F. in an inert nitrogen atmosphere for 30 minutes, with agitation. The reaction mass was filtered hot. This filtrate product was used as an additive in the test reported hereinafter. It analyzed 2.92% P and 5.91% S.

(b) 188 grams of the above reaction product 2 (a) was mixed with 11.2 grams of potassium hydroxide and 21.5 grams of water and heated on a steam bath for two hours with agitation, and then blown with air at 250° F. for two hours. The reaction mass was then filtered hot. The filtrate product analyzed 3.64% ash.

Following the procedure of Example 1, except using 55 grams of the sulfide, a sulfide-nitrile reaction product was prepared (analysis: 1.55% P and 5.78% S). This (181 grams) was converted to its barium metal derivative by reaction with barium hydroxide octahydrate (31.4 grams) at steam bath temperatures, air blowing and filtering hot. The resulting product analyzed 1.10% ash. Attempts to react the above nitrile with phosphorus pentasulfide, even in the presence of a volatile solvent, at 200° F. gave only a very small amount of filtrate reaction products.

In order to demonstrate the properties of the sulfide-nitrile reaction products of the invention in improving the characteristics of lubricating oils, a number of representative additives were incorporated into conventional lubricating oils. The lubricating oils containing these additives were tested according to laboratory test procedures for evaluating the service stability of oils as described in a paper by R. E. Burk, E. C. Hughes, W. E. Scovill and J. D. Bartleson presented at the Atlantic City Meeting of the American Chemical Society in September, 1941, and in another paper by the same authors presented at the New York City Meeting of the American Chemical Society in September, 1944, published in Industrial and Engineering Chemistry, Analytical Edition, vol. 17, No. 5, May, 1945, pages 302–309. The latter paper also correlates the results of such laboratory tests with the so-called standardized "Chevrolet Engine Test."

Essentially the laboratory test equipment consists of a vertical thermostatically heated, large glass test tube, into which is placed a piece of steel tubing of about one-third its length and of much smaller diameter. A piece of copper-lead bearing strip is suspended within and from the upper end of the steel tube by a copper pin, and an air inlet is provided for admitting air into the lower end of the steel tubes in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "Standard" test the temperature used is approximately the average temperature of the crankcase. The rate of air flow per volume of oil is adjusted to the same as the average for a test engine in operation. Of the catalytic effects, those due to iron are the most important. They are empirically duplicated by the addition of a soluble iron salt. Those due to lead-bromide are duplicated by its addition. In the "Standard" test, 0.012% of iron salt is added; and in the "Iron Tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following table were obtained from tests using:

A 160 cubic centimeter sample of the lubricant composition—

70 liters of air per hour
    100 square centimeters of steel surface
    4.4 square centimeters of copper-lead surface
    1.0 square centimeters of copper-surface
    0.01% by weight of lead bromide powder
    0.05% soluble iron calculated as $Fe_2O_3$
    (Ferric 2-ethyl hexoate in C. P. Benzene)

The "Iron Tolerance" tests were run at 280° F. for thirty-six hours. The lacquer is deposited on the steel tube and is determined by difference in weight of the tube after washing with chloroform and drying to constant weight. The corrosion was determined by difference in weight of the metal pieces after scrubbing with chloroform. The used oil was sufficient to enable the determination of all of the usual oil test, viz., isopentane insolubles, viscosity, acid number, etc.

The data in the following table show the results obtained in testing the new additives by the tests described.

"Iron Tolerance" tests on a conventional Mid-Continent acid treated heavy duty lubricating oil base stock (S. A. E. 30) and compositions containing this oil and nitrile-sulfide reaction products of the invention were run for several of the additives. The results given in the following table are representative.

Table I

| Additive of Example No. | None | 1 | 2 (a) | 2 (b) |
|---|---|---|---|---|
| Concentration of Additive in per cent by weight | 0 | 1.5 | 1.5 | 1.5 |
| Lacquer Deposit (in milligrams) | 39.4 | 7.8 | 0.1 | 0.4 |
| Sludge (isopentane insoluble in milligrams) | 809. | 59.9 | 1.4 | 47.2 |
| Corrosion (in milligrams weight loss) of: Cu-Pb | 6.4 | −0.8 | 0.2 | −0.7 |
| Acid Number | 9.4 | 3.2 | 2.2 | 1.6 |
| Viscosity Increase (SUS) | 658 | 39 | 0 | 21 |

These data show the marked improvement imparted to the lubricating oil by the sulfide-nitrile reaction products of the invention. The very marked improvement is particularly noteworthy since these are achieved with only 1.5% on the additives in the oil.

It is appreciated that it has been proposed heretofore to react phosphorus pentasulfide with e. g., heptadecyl nitrile or pentadecyl nitrile under reaction conditions which give a reaction product which is not soluble in petroleum hydrocarbon lubricants. The reaction products of the invention are distinctly different and are soluble in hydrocarbon oils.

In order to prevent foaming of the oil containing a small proportion of the additive it is desirable in some cases to add a very small amount of tetra-amyl silicate, or an alkyl ortho carbonate, ortho formate or ortho acetate. 0.0003% of polyalkyl-silicone oil, or 0.001% of tetra-amyl silicate was found to prevent foaming upon bubbling of air through oil containing a few per cent of the additive.

It will be obvious to one skilled in the art that sulfide-nitrile reaction products and similar products obtained by introducing phosphorus and/or sulfur into a nitrile as prepared according to different procedures but having substantially the same properties as those herein described, may be converted to derivatives or made up into lubricant compositions or both in accordance with the invention. The invention as claimed contemplates all such compositions except as do not come within the following claims.

I claim:

1. As a composition for stabilizing mineral oil which is subject to oxidative deterioration a mineral oil-dispersible cation radical derivative of a reaction product of one mole of an aliphatic nitrile having from about 12 to about 18 carbon atoms in the molecule and 0.1 to 1.0 mole of a phosphorus sulfide reacted at a temperature of about 400° F. for about ½ hour to form a mineral oil-dispersible reaction product, said derivative containing from 0.25 to 6.0 equivalents per mole of the sulfide in the sulfide-nitrile reaction product of an alkali metal cation.

2. A composition of claim 1 wherein the metal is potassium.

3. A lubricant consisting principally of a combination of a major proportion of a mineral lubricating oil and a minor proportion sufficient to stabilize said oil against oxidation of the composition of claim 1.

4. A lubricant consisting principally of a combination of a major proportion of a mineral lubricating oil and a minor proportion sufficient to stabilize said oil against oxidation of the composition of claim 2.

JOHN D. BARTLESON.

REFERENCES CITED

The following references are of record in the file of this patent:

UNITED STATES PATENTS

| Number | Name | Date |
|---|---|---|
| 2,116,472 | Ralston | May 3, 1938 |
| 2,316,090 | Kelso | Apr. 6, 1943 |
| 2,399,243 | Musselman | Apr. 30, 1946 |
| 2,403,894 | Bartleson | July 9, 1946 |
| 2,415,838 | Musselman | Feb. 18, 1947 |
| 2,416,807 | Watkins | Mar. 4, 1947 |